United States Patent [19]

Liu et al.

[11] 4,398,210

[45] Aug. 9, 1983

[54] IMPULSE NOISE DETECTION CIRCUIT FOR TV SIGNALS

[75] Inventors: Frank C. Liu, Phoenix, Ariz.; Yih-Sien Kao, Cranbury, N.J.

[73] Assignee: RCA Corporation, New York, N.Y.

[21] Appl. No.: 275,711

[22] Filed: Jun. 22, 1981

[51] Int. Cl.³ .................. H04N 5/21; H04N 9/535
[52] U.S. Cl. ..................................... 358/36; 358/167
[58] Field of Search .......................... 358/36–38, 358/160, 162, 166, 167, 904

[56] References Cited

U.S. PATENT DOCUMENTS 4,142,211  2/1979  Faroudja ...................... 358/36 X

FOREIGN PATENT DOCUMENTS 4728     10/1979  European Pat. Off. ............ 358/167
1287114  1/1969   Fed. Rep. of Germany ...... 358/167

*Primary Examiner*—Robert L. Richardson
*Attorney, Agent, or Firm*—E. M. Whitacre; J. S. Tripoli; E. P. Herrmann

[57] ABSTRACT

Impulse noise detection circuitry for determining the occurrence of short noise pulses in TV video signal includes two 1H delay lines to align successive image lines for signal comparison. The amplitude of signal from one image line is compared with the signal amplitude of a succeeding and a preceding image line along a vertical line. If the amplitude of the one signal concurrently exceeds the signal of both the preceding and the succeeding image lines, then a control signal, indicative of the presence of impulse noise, is produced.

10 Claims, 6 Drawing Figures

IMPULSE NOISE DETECTION CIRCUIT FOR TV SIGNALS

BACKGROUND OF THE INVENTION

This invention relates to systems for reducing the effects of impulse noise in video signals processed in a television receiver and more particularly to circuitry for detecting the occurrence of the impulse noise and for generating a signal to initiate signal compensation.

Impulse noise in the video signal of a TV receiver is characterized by abrupt signal aberrations of relatively short duration. It is typically generated as interference produced by the arcing of electric motors, e.g., hair dryers, vacuum cleaners, etc., lightning, automobile ignition systems, etc. These systems generate RF noise signals which tend to interfere constructively with TV broadcast signals in the RF spectrum.

Impulse noise generally has a broad frequency spectrum and a wide dynamic range. In TV receivers the signal spectrum is essentially as broad as the frequency response characteristics of the circuitry through which it has been processed. The amplitude range of the impulse noise often exceeds the dynamic range of the composite video signal. Typically the impulse noise occurs as signal spikes of short duration, e.g., less than 2-3 microseconds and at a rate which is lower than the TV line frequency with an almost non-existent line-to-line correlation.

Impulse noise detectors heretofore employed have typically consisted of circuitry for determining the presence of large noise spikes. The video signal amplitude is compared with a threshold value set at the nominal maximum value of the composite video signal, and any signal exceeding the threshold is presumed to be impulse noise. This type of system is ineffective for determining impulse noise occurrences with amplitudes within the dynamic range of the composite signal, which noise may produce undesirable results on the displayed image.

The TV signal, from image line (horizontal) to image line is highly redundant. Video signal at corresponding points on adjacent lines will nominally be of similar amplitude values unless an abrupt horizontal edge occurs in the picture. The abrupt edge will generally affect the video signal in a number of lines so that the line-to-line signal before the edge is highly redundant, and the line-to-line signal after the horizontal edge, though different, is also highly redundant. It is very unlikely, in the absence of noise, that the signal of one horizontal image line will be radically different from the signals of both the preceding and succeeding horizontal lines. The present inventors utilize the line-to-line signal redundancy to advantage to determine when impulse noise is present. By successively performing a point-by-point comparison of the signal amplitude of one image line with corresponding points of the preceding line and the succeeding line the general redundancy pattern of the current line is determined with respect to the succeeding and preceding line. When no such relationship exists it is highly probable that impulse noise has been detected.

BRIEF SUMMARY OF THE INVENTION

The impulse noise detector includes signal delay elements for successively delaying video signal by two horizontal line periods. Signal delayed by one line period is linearly added to the complement of undelayed signal, and the summed signal is applied to a first comparator circuit where it is compared against a threshold value $V_T$. The signal delayed by one line period is similarly summed with the complement of the signal delayed two line periods, this summed signal is applied to a second comparator circuit and is also compared against the threshold value, $V_T$. In addition, the signal delayed by one line period is applied to a third comparator circuit and compared against the threshold value, $V_T$. If the three signals applied to the three comparator circuits simultaneously exceed the threshold value $V_T$, impulse noise is present in the signal delayed by one line period.

The circuitry described determines whether the amplitude of the signal on one line exceeds by a prescribed amount the amplitude of the corresponding signal of the lines above and below (as displayed) the particular line and whether the particular signal amplitude, if in fact contaminated with impulse noise, is great enough to cause deleterious effects.

DETAILED DESCRIPTION OF THE INVENTION

The current invention is primarily applicable to the baseband composite video signal. The signal at this point has been demodulated from an RF carrier. Impulse noise present on the carrier is typically reproduced in the baseband signal somewhat band limited and having a ringing characteristic. The ringing aspect of the impulse noise in the baseband composite video signal facilitates noise detection by obviating detection of both positive and negative signal excursions.

The impulse noise frequency spectrum in the baseband video signal generally follows the frequency response curve of the IF processing circuitry. Video IF detector circuits typically manifest output signals which have frequency components clustered predominantly around the frequency equal to the difference between the geometric-mean frequency of the system bandpass and the intermediate carrier frequency. In the NTSC system the predominant frequency is near 1.8 MHz.

Figure 1:
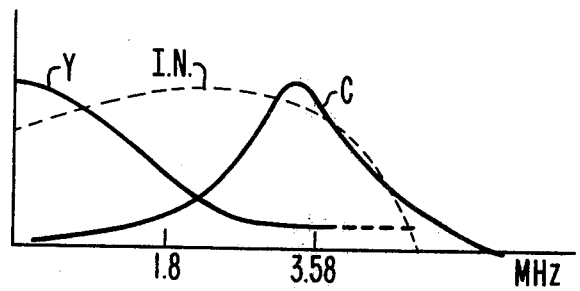
FIG. 1 is a graph of the spectral content of a composite video signal including impulse noise.

The broken line designated 1.N. in FIG. 1 illustrates generally the shape of the impulse noise energy spectrum. The energy spectrum of the luminance (Y) and chrominance (C) components of the demodulated video signal are also indicated in the Figure. In the drawings, the relative amplitude of the impulse noise spectrum may not be in the proper proportion with respect to the other signals. The important feature, however, is that the impulse noise energy peaks near 1.8 MHz and the luminance and chrominance energy are both low in this region. Therefore, the noise/signal ratio is highest in this region and should be the optimum frequency range in which to detect impulse noise in the video signal.

Figure 2:
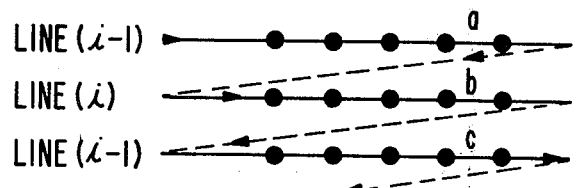
FIG. 2 is a graphic illustration of the spatial relationship of picture points in successive TV lines as reproduced in the displayed picture.

As mentioned previously, noise detection will be effectuated with the use of delayed signal. It will be presumed that the signal delay elements are of the charge transfer device type and that the signal will be rendered to sampled data format, i.e., the signal is not a smoothly varying signal but rather a signal having constant amplitude values over each sampling period, each amplitude value corresponding to the amplitude of the signal being sampled at the particular sampling interval. The delayed signal can therefore be considered as a plurality of discrete signal points. Consider the signal representation shown in FIG. 2. Corresponding portions of three image lines are shown with the dots indicating the sampling points. Line (i) is presumed to be the current horizontal line being displayed. Line (i−1) is a horizontal line previously displayed and line (i+1) is the next successive horizontal or image line to be reproduced. The dots designated a, b, c are three successive picture points located on a vertical line in the reproduced picture.

In normal TV signals there is a high degree of vertical redundancy. This implies that the signal amplitude value at point b will be similar to that at points a and c or if a horizontal edge is present in the picture the amplitude of point b should be similar to the amplitude of at least one of the points a or c. Remember that in the absence of noise it is very unlikely that the amplitude at b will vary significantly from the amplitude at a and c.

Assume that when two horizontal lines are substantially redundant the amplitude of adjacent vertical points will not differ by more than some value $\Delta R$. Then if lines (i−1) and (i) are redundant, $$b-a \leq \Delta R.$$

Similarly if lines (i) and (i+1) are redundant $$b-c \leq \Delta R.$$

where a, b and c represent the amplitude of the respective signals at points a, b and c. When a horizontal edge occurs a and b will be greater than c, or b and c will be greater than a. In the first case $|b-a| \leq \Delta R$ and $|b-c| > \Delta R$ and in the second case $|b-a| > \Delta R$ and $|b-c| \leq \Delta R$. On the other hand if an impulse noise condition causes b to be greater than both a and c then both $|b-a| > \Delta R$ and $|b-c| > \Delta R$ and this is the condition for impulse noise detection.

The impulse noise detection system of the present invention subtracts, point-by-point line (i−1) from line (i) and line (i+1) from line (i). The results of these subtractions are compared with a threshold signal which is sufficiently greater than $\Delta R$ to insure a margin against false noise detection. When the result of both subtractions are simultaneously greater than the threshold signal a control signal is generated to perform noise compensation.

Figure 3:
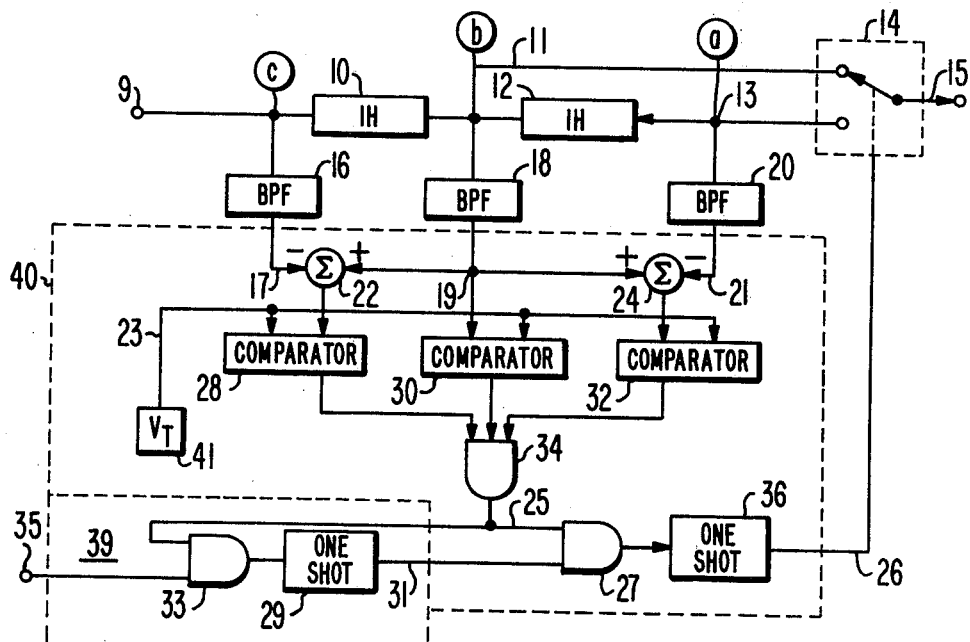
FIG. 3 is a block diagram of the impulse noise detection circuitry embodying the present invention.

FIG. 3 illustrates circuitry for performing impulse noise detection as described. In FIG. 3 the circuitry circumscribed by the broken line 40 performs the line-to-line signal comparison. The circuitry outside of box 40 aligns three successive lines of video signal in the requisite temporal relationship so that corresponding vertical picture points are simultaneously available for comparison by circuitry 40. In addition, there is a switch 14, responsive to a control signal on connection 26, generated by circuitry 40, for substituting delayed signal for signal containing noise.

Demodulated baseband video signal is applied at terminal 9, which signal is delayed one horizontal line period by the delay line 10 and is made available at connection 11. The delayed signal is applied to the second delay line 12 in which it is delayed a second horizontal line period before being available at connection 13. In the absence of impulse noise in the signal at connection 11, the signal delayed one horizontal line period is applied via switch 14 to terminal 15 from which point it is further processed for display on the receiver kinescope. When impulse noise is detected in the signal at connection 11 output terminal 15 is connected via switch 14 to connection 13 for a predetermined period. A segment of the signal available at connection 13, generally redundant with the signal at connection 11 but unlikely to be contaminated with noise in the corresponding interval, is substituted for the impulse noise affected signal. The connections designated a, b and c correspond, at least temporarily, to the points designated a, b and c in FIG. 2 with the reservation that the designations a, b and c move rightward over every point in the respective line. In FIG. 3 the b signal and c signal are applied to circuitry 22 and the b signal and a signal are applied to similar circuitry 24. Circuit 22 produces an output signal related to the difference (b−c) and circuitry 24 produces an output signal related to the difference (b−a). Circuits 22 and 24 are linear signal subtractors such as unity gain differential amplifiers which are common to the circuit arts and will not be discussed further. The output signal from circuit 22 is applied to one input terminal of comparator 28. The output signal from circuit 24 is applied to comparator 32 and the signal at point b is applied to comparator 30. A substantially constant threshold or reference signal, $V_T \geq \Delta R$ from signal source 41 is applied via connection 23 to respective second input terminals of comparators 28, 30 and 32 for comparison against the applied video difference signals. The amplitude $V_T$ of the threshold signal is chosen to be greater than the normal difference between nominally redundant signals with sufficient margin so as not to produce false detection signals.

Comparator 30 is included to prevent false detection due to one black horizontal line surrounded by white horizontal lines and is only employed in conjunction with the filter 18 designed to pass impulse noise signal components but not the line frequency signal of a solid horizontal black line. In light of the fact that the occurrence of a black horizontal line between two white lines is remote, comparator 30 can usually be excluded with little affect on the noise detection.

The output signals from the comparator circuits assume a "high" logic state when the variable input signals exceed the applied constant threshold signal $V_T$. The comparator output signals are applied to an AND gate 34 which produces a "high" output state at connection 25 when the three comparator output signals are simultaneously in the "high" state, and produces a "low" output state otherwise. Output signal from AND gate 34 is applied via AND gate 27 to the pulse generator 36 which generates a control signal of predetermined duration and amplitude responsive to signal at its input terminal, e.g., going through a "low" to "high" transition. The control signal on connection 26 effects signal substitution by activating switch 14. Pulse generator 36, for example, may be a retriggerable monostable multivibrator which produces an output pulse of duration in the range of 1-2 μs.

An ancillary circuit 39 is included in the FIG. 3 detector circuit to preclude signal substitution unless impulse noise is detected in the vertical interval of the composite video signal. If impulse noise is detected during the vertical blanking interval the signal environment is presumed to be noisy and the substitution switch is operable for the succeeding field period. If no noise is detected in the particular vertical blanking interval, no signal will be substituted in the particular field even if subsequent noise is detected.

Circuit 39 comprises AND gate 33 and a retriggerable monostable (ONE SHOT). Noise detection pulses from the output terminal of AND gate 34 are applied to one input terminal of AND gate 33 and vertical blanking pulses are applied to a second input terminal of AND gate 33 from terminal 35. When a noise pulse occurs concurrently with the vertical blanking pulse, the output potential of AND gate 33 goes through a "low" to "high" transition triggering a pulse from ONE SHOT 29. The pulse generated by ONE SHOT 29 is typically one video field in duration but may be expanded to encompass a plurality of fields.

The output pulse produced by ONE SHOT 29 is applied to a second input of AND gate 27 enabling output pulses from AND gate 34 at connection 25 to trigger the pulse generator 36. However, whenever the ONE SHOT 29 output signal on connection 31 is in a low state, AND gate 27 is precluded from passing noise detection signals on connection 25 to the trigger input terminal of pulse generator 36.

The function of the circuit 39 may be further expanded to enabling the pulse generator 36 for the condition that noise is present in the horizontal blanking intervals or a combination of noise occurring in both the horizontal and vertical blanking intervals simply by logically "ORing" the vertical and horizontal blanking pulses at terminal 35.

Circuit 39 is not necessary for the operation of circuit 40 but in certain environments has produced desirable results. There is a trade off to be made whether or not circuit 39 is included. With circuit 39 included there is likely to be less false noise detection. On the other hand, true noise that does occur when the AND gate 27 and thereby pulse generator 36 is disabled will pass to the picture. If circuit 39 is not included video signal may occasionally be detected as noise and signal substitutions made when unnecessary tending to reduce picture resolution. The particular noise environment and video application is therefore determinative of whether or not a circuit such as circuit 39 is incorporated in the noise detector.

Several comments are in order at this point which apply if the delay elements are of the sampled data type and the sampling is performed at a multiple of the chrominance subcarrier frequency. If the sampling rate is performed at three times the subcarrier frequency, picture elements on alternate lines are displaced by 60 degrees or 46.56 nanoseconds because the subcarrier exhibits a 180 degree phase difference line-to-line. One method of aligning the picture elements is to design delay element 10 with a delay period of 1H+46.56 ns and delay element 12 with a signal delay period of 1H−46.56 ns. Other techniques are available but they are not the object of this invention; see for example U.S. Pat. No. 3,946,432. It has been determined experimentally though, that for the three time subcarrier sampling rate, failure to align the pixels, i.e., failure to include the ±46.56 ns delays in the 1H lines, does not appreciably affect the efficiency of noise detection or the probability of detection errors.

The impulse noise detection system is equally applicable to linear delay elements or to sampled data type delay elements. With respect to the latter category, the sampling rate may be any convenient frequency to provide for sufficient signal bandwidth. If the chosen sampling frequency results in the aforementioned misalignment of line-to-line picture elements, alignment may be accomplished by inclusion of incremental delay stages where necessary or desired.

It is also noted that color signals cannot simply be substituted from adjacent lines since there is a 180 phase difference of the chrominance signal line-to-line. One method of overcoming this difficulty is explicated in copending application Ser. No. 044,364 now U.S. Pat. No. 4,275,785 filed June 1, 1979, entitled, "Defect Compensation for Color Television" incorporated herein by reference.

It should also be appreciated that the foregoing impulse noise detection technique is equally applicable to digital as well as analog manifestations of the video signal. The only difference being that the substraction circuits 22 and 24 and the comparators must be of a digital variety.

Another aspect to be considered is the time delay involved in noise detection. Circuitry 40 requires a finite time to determine the presence of noise in the signal at connection 11. Consequently, in order that the control signal at connection 26 occurs in time to substitute signal from delay line 12, it may be necessary to include added delay elements respectively between the switch 14 and connections 11 and 13. This added delay may be incorporated within the delay elements 10 and 12 as will be described hereinafter in reference to FIG. 6.

Referring again to FIGS. 1 and 3, in order to take advantage of the greater Noise/Signal ratio in the 1.8 MHz frequency region, bandpass filters 16, 18 and 20 are respectively serially connected between the impulse noise detection circuit 40 and the three signal terminals 9, 11 and 13. The pass band of these filters should not be designed particularly narrow in order that sufficient energy from low level noise impulses can be passed to enable detection. Experimentally it has been found that a pass band of about 1 MHz produces favorable results, permitting a choice of threshold level to permit detection of substantially all impulse noise which would produce an objectionable effect in the display.

Figure 4:
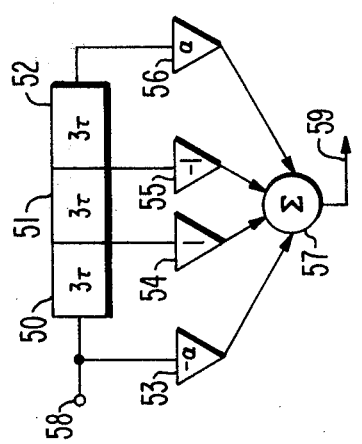
FIG. 4 is a block diagram of a bandpass transversal filter which may serve as one of the bandpass filter circuits shown in FIG. 3.

The bandpass filters may be realized with transversal filter technology. Transversal filters use one or more time delayed waveforms of a particular input signal, which delayed waveforms are weighted and summed with the proper signs to generate desired filter characteristics with a finite impulse response. FIG. 4 illustrates a transversal filter employing three delay stages 50, 51 and 52, four signal weighting elements 53, 54, 55 and 56 and a summing circuit 57. Unfiltered signal is applied at terminal 58 and filtered signal is recovered at terminal 59. The tranfer function for the filter with the signal weights of elements 58, 54, 55 and 56 respectively equal to $(-)\alpha$, $(+)1$, $(-)1$ and $(+)\alpha$ is described in the Z or sampled data domain by $$H_3(z) = -\alpha + Z^{-3} - Z^{-6} + \alpha Z^{-9}$$

where $Z = e^{-j2\pi ft}$ and $0 < \alpha < 1$. $T = \tau =$ the delay period. The transfer function for $\alpha = \frac{1}{2}$ and $\tau = 93.1$ ns is shown in FIG. 5 and is typical of the response from a 4 tap transversal filter.

It is advantageous to utilize a transversal filter for this particular application because such filters can be designed using charge transfer device delay stages and incorporated integrally with the 1H delay elements 10 and 12. When the transversal filter is realized with charge transfer device technology the weighting elements 53-56 may be designed integral to the signal tap structure of the delay elements, see for example C. Sequin and M. Tompsett, *Charge Transfer Devices*, Academic Press, N.Y., 1975, p. 216 et seq., and thereby reduce the number of component parts.

Figure 5:
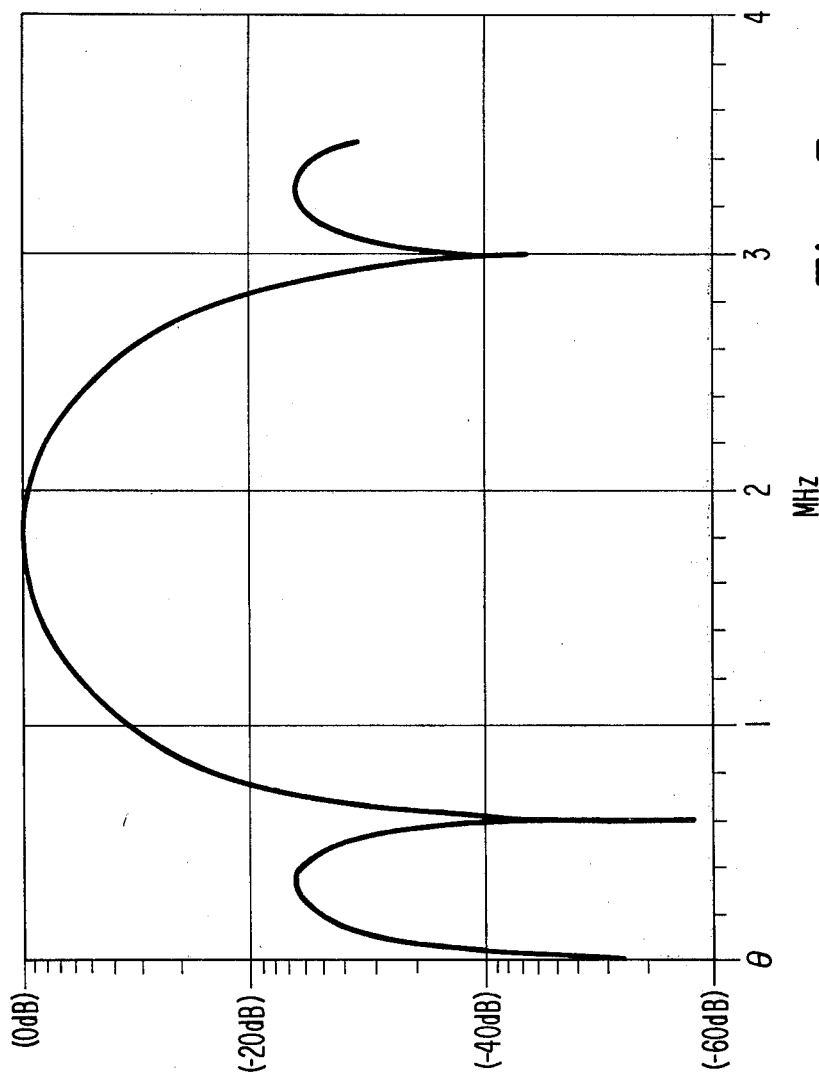
FIG. 5 is a graph of the transfer function of the FIG. 4 filter.

A choice of $\tau = 93.1$ ns for the delay elements shown in FIG. 4 will generate the FIG. 5 transfer function. A 93.1 ns delay period corresponds to sampling at three times the chrominance subcarrier rate—the rate employed in charge transfer delay lines currently used in particular commercial TV receivers. The 3 dB bandwidth of the transversal filter is about 1 MHz and the side-lobes are down at least 24 dB. The particular tap weights were chosen for convenient implementation in either charge transfer device or digital transversal filters. If the 1H delay lines 10 and 12 are realized with charge transfer devices and the input signal is sampled and clocked at three times the chroma subcarrier the transversal filters may be integrated into the 1H delay elements as shown in FIG. 6.

Figure 6:
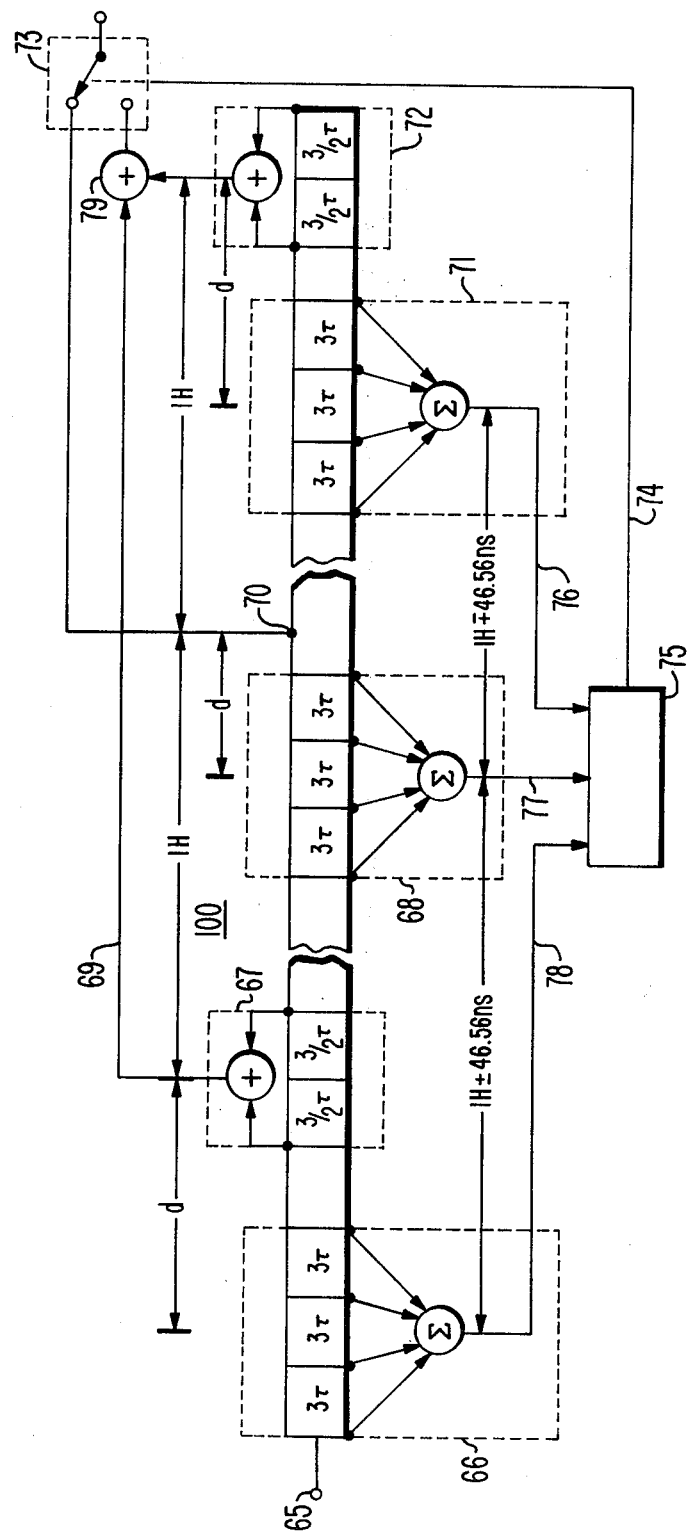
FIG. 6 is a block diagram of an impulse noise detection/signal substitution system wherein 1H and 2H delayed signals are tapped from a single 2H delay element and the bandpass transversal filters are integral to the 2H delay element.

FIG. 6 is a diagrammatic representation of a single delay line with facility to delay signal in excess of two horizontal line times and susceptible of having signal nondestructibly tapped from a plurality of stages. Input signal is applied at terminal 65 which signal is serially transferred along the cascade connected delay stages from left to right. Each serial stage in the delay element delays the signal by $\tau$ seconds (presumed to be 93.1 ns for $3\times$ subcarrier sampling rate). The transversal filters 66, 68 and 71, or at least the delay portions thereof are incorporated into the delay line. Each filter taps four delayed signals from the delay line at intervals of three $\tau$ delay stages.

The signal that is normally displayed is tapped from the delay line at point 70, and applied to a first input terminal of the signal substitution switch 73. Signal to be substituted for the current display signal when impulse noise is detected therein is produced by circuits 67 and 72 which (a) invert the phase of the chrominance; see Copending application Ser. No. 044,364 (now U.S. Pat. No. 4,272,785) filed June 1, 1979 entitled, "Defect Compensation for Color Television" (incorporated herein by reference) and (b) average the signal from two points which horizontally straddle the current picture point. Output signals from the circuit elements 67 and 72 are then averaged in element 79 to produce a four point average which is applied to a second input terminal of signal substitution switch 73.

Extra delay stages are incorporated between the transversal filter 68 and the current signal tap point 70 to accommodate the finite delay, "d", inherent in the impulse noise detection circuit 75. Consider that it takes "t" seconds for detection circuit 75 to generate an output control pulse once an impulse noise signal appears at its impulse connection 77 from transversal filter 68. The delay "d" which is typically longer than "t" permits the control signal to alternate the substitution switch position in advance of the impulse noise reaching the current signal tap 70. Similar delays are included between transversal filters 66, 71 and respective substitution signal tap circuits 67 and 72 to maintain each of the signals in the proper temporal relationship.

The delay period between the signals from the transversal filters is indicated as 1H±46.56 ns. The added subtracted 46.56 ns effectively aligns the picture points when sampling is at three times the subcarrier. However, computer simulations have indicated that there is no significant degradation in impulse noise detection if the added/subtracted 46.56 ns is not included within the delay.

While the foregoing has described a noise detection circuit which compares three signals, one from each of three successive image lines, it should also be appreciated that the system is equally applicable to comparing multiple points from each of the successive image lines or for comparing image points from more than three successive lines.

What is claimed is:

1. Detection circuitry for detecting electrical noise in a baseband composite television video signal including luminance and chrominance components formatted in horizontal image segments, comprising:

means for successively temporally aligning at least three successive horizontal image segments having an input terminal for application of said composite video signal and having first, second, and third video signal output terminals, wherein output signal from the third output terminal is delayed from output signal from the second output terminal, and the output signal from the second output terminal is delayed from output signal from the first output terminal;

a source of reference signal;

means, including a first subtraction circuit having first and second input terminals connected to said first and second output terminals, for algebraically subtracting the video signal at the first output terminal from the video signal at the second output terminal and producing a first difference signal;

means including a second subtraction circuit having first and second input terminals connected to said second and third output terminals, for algebraically subtracting the video signal at the third output terminal from the video signal at the second output terminal and producing a second difference signal;

first and second comparator circuits for comparing said first and second difference signals respectively against said reference signal, said comparators producing at respective output terminals thereof respective prescribed output signals whenever the respective difference signal is greater than the reference signal;

means connected to the output terminals of said first and second comparator circuits, for producing a control signal whenever the first and second comparator circuits concurrently produce said prescribed output signals.

2. Detection circuitry for detecting impulse noise in a composite television video signal, said signal being formatted in horizontal image segments, comprising:

a source of composite video signal;

delay means providing at first and second output terminals said video signal delayed respectively by the duration of one and two horizontal segments;

first means including a subtraction circuit for algebraically subtracting said video signal from the video signal delayed one horizontal segment and producing a first difference signal;

second means including a further subtraction circuit for algebraically subtracting said video signal delayed two horizontal segments from the signal delayed one horizontal segment and producing a second difference signal;

a source of reference signal;

first and second comparator circuits for respectively comparing each of said first and second difference signals against the reference signal, said respective comparator circuits producing prescribed output signals whenever the respective difference signals are in a predetermined relation to the reference signal;

means reponsive to the first and second comparator output signals for generating an impulse noise detection signal whenever said first and second comparator circuits simultaneously produce said prescribed output signals.

3. The detection circuit set forth in claim 2 including further circuitry responsive to vertical blanking pulses and coupled with said means for producing a control signal for inhibiting the occurrence of control pulses in a video field period unless noise is detected in the vertical blanking period preceding said field.

4. Detection circuitry for detecting impulse noise in a television type video signal, said signal being formatted in horizontal image segments comprising:

a source of video signal; delay means providing at first and second output terminals said video signal delayed respectively by the duration of one and two horizontal segments;

first means for subtracting said video signal from the video signal delayed one horizontal segment and producing a first difference signal;

second means for subtracting said video signal delayed two horizontal segments from the signal delayed one horizontal segment and producing a second difference signal;

a source of reference signal;

first and second comparator circuits for respectively comparing each of said first and second difference signals against the reference signal, said respective comparator circuits producing prescribed output signals whenever the respective difference signals are in a predetermined relation to the reference signal;

a third comparator circuit for comparing the video signal delayed one horizontal segment against said reference signal, said third comparator producing a prescribed output signal whenever said video signal delayed one horizontal segment is in a predetermined relation to said reference signal; and means responsive to the first, second and third comparator output signals for generating an impulse noise detection signal whenever said first, second and third comparator circuits simultaneously produce said prescribed output signals.

5. The detection circuits set forth in claim 4 further including first and second and third bandpass filters, each designed to pass signals in a like prescribed pass band, said first bandpass filter connected between the source of video signal and said first means for subtracting signal, said second bandpass filter connected between the delay means first output terminal and said first and second means for subtracting signal and said third bandpass filter connected between said delay means second output terminal and said second means for subtracting signal.

6. The detection circuit set forth in claim 5 wherein the center of the pass band of said first, second and third bandpass filters is at a frequency equal to approximately one-half the baseband composite video signal bandwidth.

7. The detection circuit set forth in claim 5 wherein the center of the pass band of said first, second and third bandpass filters is 1.8 MHz.

8. The detection circuit set forth in claim 4 wherein the first, second and third bandpass filters are respectively first, second and third transversal filters.

9. The detection circuit set forth in claim 8 wherein the first, second and third transversal filters are incorporated integrally with said delay means.

10. The detection circuit set forth in claim 8 wherein each of said transversal filters comprises:

first, second and third cascade connected delay elements, each of the delay elements providing like delay periods;

first, second, third and fourth signal taps for obtaining from said delay elements, respectively undelayed signal and signal delayed one, two and three delay periods; and means for summing the signal at said first, second, third and fourth signal taps.

* * * * *